(12) United States Patent
Goto et al.

(10) Patent No.: US 8,603,942 B2
(45) Date of Patent: Dec. 10, 2013

(54) HONEYCOMB CATALYST BODY

(75) Inventors: Chika Goto, Nagoya (JP); Masataka Yamashita, Nagoya (JP); Toshio Yamada, Nagoya (JP); Yukio Miyairi, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 295 days.

(21) Appl. No.: 13/030,521

(22) Filed: Feb. 18, 2011

(65) Prior Publication Data
US 2011/0224069 A1 Sep. 15, 2011

(30) Foreign Application Priority Data

Mar. 11, 2010 (JP) ................... 2010-054431

(51) Int. Cl.
*B01J 35/04* (2006.01)
(52) U.S. Cl.
USPC .. 502/439; 502/100; 502/527.18; 502/527.19
(58) Field of Classification Search
None
See application file for complete search history.

(56) References Cited

U.S. PATENT DOCUMENTS

| 5,853,459 A | 12/1998 | Kuwamoto et al. | |
|---|---|---|---|
| 2007/0020155 A1* | 1/2007 | Ohno et al. | 422/177 |
| 2008/0120968 A1 | 5/2008 | Beall et al. | |

FOREIGN PATENT DOCUMENTS

| JP | 05-118211 A1 | 5/1993 |
|---|---|---|
| JP | 06-182204 A1 | 7/1994 |
| JP | 10-030428 A1 | 2/1998 |
| JP | 2003-148127 | 5/2003 |
| JP | 2007-144359 | 6/2007 |
| JP | 2009-131780 | 6/2009 |
| WO | 2009/148498 A1 | 12/2009 |

OTHER PUBLICATIONS

Japanese Office Action, Japanese Application No. 2010-054431, dated May 14, 2013 (2 pages).

* cited by examiner

*Primary Examiner* — Melvin C Mayes
*Assistant Examiner* — Colin W Slifka
(74) *Attorney, Agent, or Firm* — Burr & Brown

(57) ABSTRACT

There is provided a honeycomb catalyst body comprising a honeycomb base body having porous partition walls forming a plurality of divided cells which extend from one end face of honeycomb base body to its other end face and which function as a fluid passage, and an outer wall present at the outermost peripheral portion of honeycomb base body, plugged portions provided so as to plug part of the plurality of divided cells, and a catalyst loaded on the partition walls of honeycomb base body. The plurality of divided cells include outermost peripheral cells formed by the partition walls and the outer wall, and of the outermost peripheral cells, those cells whose hydraulic diameter is 5 to 75% of the hydraulic diameter of a cell other than the outermost peripheral cells, are through-cells having no plugged portion.

8 Claims, 2 Drawing Sheets

HONEYCOMB CATALYST BODY

BACKGROUND OF THE INVENTION

1. Field of the Invention

The present invention relates to a honeycomb catalyst body. More particularly, the present invention relates to a honeycomb catalyst body which can efficiently remove the fine particles contained in the exhaust gas emitted from a direct injection gasoline engine, which is low in pressure loss increase, which can eliminate the CO, HC and NOx contained in the exhaust gas, and which, during the use, hardly generates cracks in the circumference.

2. Description of Related Art

A reduction in fuel consumption of automobile is required from the standpoints of protection of global environment and resource saving. In the gasoline engine used mainly in passenger cars, direct injection of fuel is being pushed forward.

In the gasoline engine, since fuel injection from suction port has been employed, generation of soot [particulate matter (PM)] has been slight and it has caused little problem. However, in the gasoline engine of fuel direct injection type, generation of PM is greater compared to the fuel injection from suction port and a measure for not releasing the generated PM into the atmosphere has been needed.

Meanwhile, a honeycomb structure has been used as a capturing filter for removing the particulate matter (PM) discharged from the diesel engine. As the honeycomb structure used as a filter for capturing the particulate matter, there has been used a plugged honeycomb structure having plugged portions at given positions of the two end faces of the honeycomb structure (see, for example, Patent Documents 1 to 3). Here, the plugged honeycomb structure refers to a honeycomb structure having a honeycomb structure body having porous partition walls forming a plurality of divided cells each to function as a passage for fluid(exhaust gas or purified gas) and an outer wall present at the outermost peripheral portion of the honeycomb structure body, and plugged portions provided at "the open ends of given cells at the fluid (exhaust gas) inlet side end face of the honeycomb structure body" as well as at "the open ends of residual cells at the fluid (purified gas) outlet side end face of the honeycomb structure body". In such a plugged honeycomb structure, an exhaust gas flows into cells from the exhaust gas inlet side end face; then, the exhaust gas passes through partition walls; thereafter, the exhaust gas(purified gas) is discharged from the exhaust gas outlet side end face. During the passage of exhaust gas through partition walls, the PM contained in the exhaust gas is captured by partition walls and the exhaust gas turns into a purified gas.

In such a plugged honeycomb structure, however, there have been cases that soot remains in the low-temperature portion (circumference) and causes sudden combustion because of the soot remaining. Accordingly, there has been a problem that the heat of soot combustion gives rise to local temperature rise in the peripheral portion and this local temperature rise brings about a sharp temperature gradient, causing the breakage of the peripheral portion.

As a countermeasure for such a problem, there has been used, in the diesel engine, a plugged honeycomb structure provided with plugged portions in a desired pattern so as to meet the application purpose of the structure. In, for example, the plugged honeycomb structures described in the Patent Documents 1 and 2, plugged portions are provided in such a way that each two cell ends of all the cells adjacent to the outer wall of honeycomb structure are plugged, in order to solve the problem of crack generation in the peripheral portion. By providing plugged portions in this way, no soot remains in the peripheral portion, in which temperature is lower, and the breakage of the peripheral portion is prevented.

Also, in the plugged honeycomb structure described in Patent Document 3, plugged portions are provided in the core portion (in central axis direction) of honeycomb structure in order to, for example, keep the pressure loss low while no plugged portion is provided in the portion surrounding the core portion.

Hence, it is considered to use the above-mentioned, plugged honeycomb structure used for removal of the particulate matter discharged from diesel engine, for removal of the particulate matter discharged from gasoline engine.

PRIOR ART DOCUMENT

Patent Document

Patent Document 1: JP-A-1993-118211
Patent Document 2: JP-A-1998-30428
Patent Document 3: JP-A-1994-182204

SUMMARY OF THE INVENTION

A three-way catalyst converter, an NOx occlusion and reduction catalyst or the like. have been used in order to treat the exhaust gas emitted from the gasoline engine. If a plugged honeycomb structure is mounted additionally in the exhaust gas system, there are anticipated problems such as increased pressure loss in exhaust gas system, reduction in engine output and the like.

Hence, it is considered, for example, to replace the above-mentioned three-way catalyst converter, NOx occlusion and reduction catalyst or the like. with a device obtained by loading a three-way catalyst on the partition walls of the plugged honeycomb structure described in the Patent Document 1, 2 or 3.

However, in the plugged honeycomb structure described in the Patent Document 1 or 2, there are cells which do not contribute to the purification of exhaust gas, because the two end faces are plugged. This makes smaller the effective diameter of the honeycomb catalyst body and has caused a problem of increased pressure loss. Further, there is required an additional step for plugging each two open ends of all the cells adjacent to the outer wall of honeycomb structure, which has invited a problem of production cost increase.

The plugged honeycomb structure described in the Patent Document 3 has no problem such as seen in the plugged honeycomb structure described in the Patent Document 1 or 2; however, in the former honeycomb structure, the proportion of the cells having no plugged portion (i.e. through-cells) is too large, which makes very low the efficiency of soot capture and is unable to satisfy the specified level of PM number.

Since the gasoline engine and the diesel engine differ in the fuel used, they differ not only in the amount of PM in exhaust gas but also in the particle diameter, shape and constituents of PM in exhaust gas. Accordingly, the optimum constitution (feature) of the honeycomb structure, required for capture of the PM in exhaust gas differs between the gasoline engine and the diesel engine.

The present invention has been made in view of the above-mentioned problems of prior art. The present invention is intended to provide a honeycomb catalyst body which can efficiently remove the fine particles contained in the exhaust gas emitted from a direct injection gasoline engine, which is low in pressure loss increase, which can eliminate the CO, HC and NOx contained in the exhaust gas, and which, during the use, hardly generates cracks in the circumference.

The present invention provides a honeycomb catalyst body described below.

[1] A honeycomb catalyst body comprising
a honeycomb base body having porous partition walls forming a plurality of divided cells which extend from one end face of honeycomb base body to its other end face and which function as a fluid passage, and an outer wall present at the outermost peripheral portion of honeycomb base body, plugged portions provided so as to plug part of the plurality of divided cells, and
a catalyst loaded on the partition walls of honeycomb base body, wherein
the plurality of divided cells include outermost peripheral cells formed by the partition walls and the outer wall, and
of the outermost peripheral cells, those cells whose hydraulic diameter is 5 to 75% of the hydraulic diameter of a cell other than the outermost peripheral cells is 5 to 75%, are through-cells having no plugged portion.

[2] A honeycomb catalyst body according to [1], wherein the ratio of the total area of the through-cells in the section of honeycomb base body intersecting with the central axis of honeycomb base body at right angles, to the area of the section is 0.1 to 1.5%.

[3] A honeycomb catalyst body according to [1] or [2], wherein the loaded amount of catalyst per unit volume is 10 to 60 g/L.

[4] A honeycomb catalyst body according to any of [1] to [3], wherein, in the honeycomb base body, the thickness of partition wall is 100 to 460 µm, the cell density is 31 to 56 cells/cm$^2$, the porosity of partition wall is 35 to 65%, and the average pore diameter of partition wall is 5 to 50 µm.

The honeycomb catalyst body of the present invention has a honeycomb base body having porous partition walls forming a plurality of divided cells which extend from one end face of honeycomb base body to its other end face and which function as a fluid passage and an outer wall present at the outermost peripheral portion of honeycomb base body, and plugged portions provided so as to plug part of the plurality of divided cells; therefore, the honeycomb catalyst body can efficiently remove the fine particles emitted from a direct injection gasoline engine. Further, in the honeycomb catalyst body, the plurality of divided cells include outermost peripheral cells formed by the partition walls and the outer wall, and of the outermost peripheral cells, those cells whose hydraulic diameter is 5 to 75% of the hydraulic diameter of a cell other than the outermost peripheral cells, are through-cells having no plugged portion; therefore, the pressure loss increase is small. Further, since a catalyst is loaded on the partition walls of the honeycomb base body, the CO, HC and NOx contained in an exhaust gas can be eliminated. Further, of the outermost peripheral cells, those cells whose hydraulic diameter is 5 to 75% of the hydraulic diameter of a cell other than the outermost peripheral cells, are through-cells having no plugged portion; therefore, there is no accumulation of soot in the through-cells. Accordingly, there is no combustion of the soot accumulated in the peripheral portion of honeycomb catalyst body during its use, hardly causing crack generation, namely, breakage of honeycomb catalyst body during its use.

DETAILED DESCRIPTION OF THE INVENTION

The mode for carrying out the present invention is described below. However, the present invention is in no way restricted to the following embodiment, and it should be construed that change, modification or the like. can be appropriately added to the following embodiment based on the ordinary knowledge possessed by those skilled in the art, as long as there is no deviation from the gist of the present invention and that the resulting embodiments as well fall in the scope of the present invention.

[1] Honeycomb Catalyst Body

Figure 1:
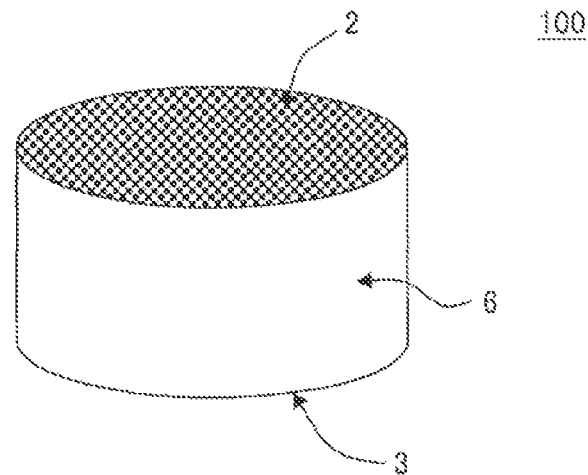
FIG. 1 is a perspective view schematically showing an embodiment of the honeycomb catalyst body of the present invention.
Figure 2:
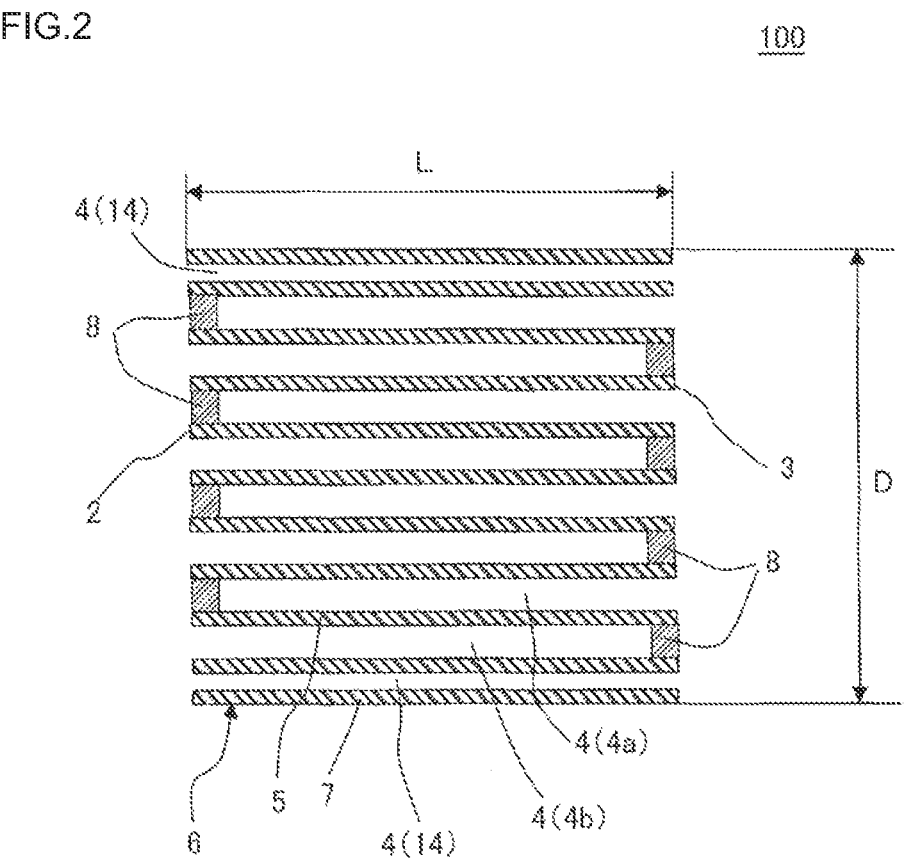
FIG. 2 is a schematic view showing a section of an embodiment of the honeycomb catalyst body of the present invention, parallel to the central axis of the embodiment.
Figure 3:
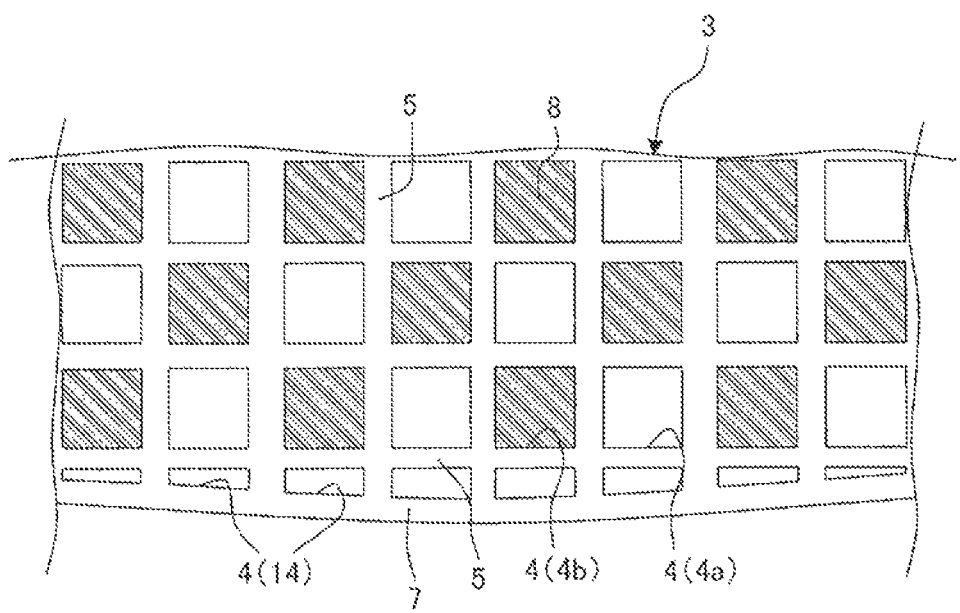
FIG. 3 is an enlarged plan view schematically showing part of one end face of an embodiment of the honeycomb catalyst body of the present invention.

FIG. 1 is a perspective view schematically showing an embodiment of the honeycomb catalyst body of the present invention; FIG. 2 is a schematic view showing a section of an embodiment of the honeycomb catalyst body of the present invention, parallel to the central axis of the embodiment; and FIG. 3 is an enlarged plan view schematically showing part of one end face of an embodiment of the honeycomb catalyst body of the present invention. As shown in FIG. 2, the honeycomb catalyst body 100 of the present invention includes a honeycomb base body 6 having porous partition walls 5 forming a plurality of divided cells 4 which extend from one end face 2 of honeycomb base body 6 to its other end face 3 and which function as a fluid passage, and an outer wall 7 present at the outermost peripheral portion of honeycomb base body 6, plugged portions 8 provided so as to plug part 4 of the plurality of divided cells 4, and a catalyst loaded on the partition walls 5 of honeycomb base body 6. The plurality of divided cells 4 include outermost peripheral cells 4(14) formed by the partition walls 5 and the outer wall 7, and of the outermost peripheral cells 4(14), those cells whose hydraulic diameter is 5 to 75% of the hydraulic diameter of a cell 4 other than the outermost peripheral cells 14, are through-cells having no plugged portion 8.

The honeycomb catalyst body 100 includes a honeycomb base body 6 having porous partition walls 5 forming a plurality of divided cells 4 which extend from one end face 2 of honeycomb base body 6 to its other end face 3 and which function as a fluid passage, and an outer wall 7 present at the outermost peripheral portion of honeycomb base body 6, and plugged portions 8 provided so as to plug part of the plurality of divided cells 4; therefore, the honeycomb catalyst body 100 can efficiently remove the fine particles emitted from a direct injection gasoline engine. Further, in the honeycomb catalyst body 100, of the outermost peripheral cells 4(14), those cells whose hydraulic diameter is 5 to 75% of the hydraulic diameter of a cell 4 other than the outermost peripheral cells 4(14), are through-cells having no plugged portion 8; therefore, a rise in pressure loss is low. Further since a catalyst is loaded on the partition walls 5 of honeycomb base body 6, the CO, HC and NOx contained in the exhaust gas emitted can be eliminated. Further, since, of the outermost peripheral cells 4(14), those cells whose hydraulic diameter is 5 to 75% of the hydraulic diameter of a cell 4 other than the outermost peripheral cells 4(14), are through-cells having no plugged portion 8, there is no accumulation of soot in the through-cells. Accordingly there is no combustion of the soot accumulated in the peripheral portion of honeycomb catalyst body during its use, hardly causing crack generation, namely, breakage of honeycomb catalyst body during its use.

[1-1] Honeycomb Base Body

The honeycomb base body 6 has porous partition walls 5 forming a plurality of divided cells 4 which extend from one end face 2 of honeycomb base body 6 to its other end face 3 and which function as a fluid passage, and an outer wall 7 present at the outermost peripheral portion of honeycomb base body 6; and the honeycomb base body 6 has a honeycomb shape.

The thickness of partition wall 5 is preferably 100 to 460 μm, more preferably 100 to 360 μm, particularly preferably 100 to 260 μm. With a partition wall thickness of smaller than 100 μm, the honeycomb catalyst body 100 may have a lower strength. Meanwhile, with a partition wall thickness of larger than 460 μm, the pressure loss during passage of exhaust gas through cells 4 may be larger. The thickness of partition wall 5 is a value obtained by a method of observing a section of honeycomb catalyst body, parallel to its central axis, using a microscope.

The cell density of honeycomb base body 6 (honeycomb catalyst body 100), i.e. the cell density in a section of honeycomb base body 6, intersecting with its central axis is preferably 31 to 56 cells/cm$^2$, more preferably 31 to 47 cells/cm$^2$, particularly preferably 31 to 40 cells/cm$^2$. With a cell density of lower than 31 cells/cm$^2$, the honeycomb catalyst body 100 may have a lower strength. Meanwhile, with a cell density of higher than 56 cells/cm$^2$, the pressure loss may be larger.

The porosity of partition wall 5 is preferably 35 to 65%, more preferably 35 to 55%, particularly preferably 38 to 44%. With a porosity of smaller than 35%, the pressure loss may be larger. Meanwhile, with a porosity of larger than 65%, the honeycomb catalyst body 100 is fragile, which may cause easy missing. The porosity of partition wall 5 is a value obtained by measurement using a mercury porosimeter.

The average pore diameter of partition wall 5 is preferably 5 to 50 μm, more preferably 7 to 15 μm, particularly preferably 8 to 13 μm. With an average pore diameter of smaller than 5 μm, the pressure loss may be larger even when the accumulation amount of soot is small. Meanwhile, with an average pore diameter of larger than 50 μm, the honeycomb catalyst body 100 is fragile, which may cause easy missing, or may show a reduction in soot capturability. The average pore diameter of partition wall 5 is a value obtained by measurement using a mercury porosimeter.

The partition walls 5 contain a ceramic as the main component. The specific material of the partition walls 5 is preferably at least one member selected from the group consisting of silicon carbide, silicon-silicon carbide composite material, cordierite, mullite, alumina, spinel, silicon carbide-cordierite composite material, lithium aluminum silicate and aluminum titanate. Of these, preferred is cordierite which is small in thermal expansion coefficient and superior in thermal shock resistance. "Contains a ceramic as the main component" means containing a ceramic in an amount of at least 90 mass % relative to the total amount of partition walls 5.

The outer wall 7 is preferably an integrally-formed layer formed integrally with a honeycomb base body 6, or a coated cement layer formed by grinding the circumference of the honeycomb base body 6 obtained, into an desired shape and then forming thereon an outer wall with a cement or the like. In the case of the integrally-formed layer, its material (ceramic material) is preferably the same as the material of the partition walls 5. When the outer wall 7 is a coated cement layer, there can be mentioned, as the material (ceramic material) of the coated cement layer, for example, a material obtained by adding, to a common material, a flux component (e.g. glass). The thickness of the outer wall 7 is preferably 0.3 to 1.5 mm.

In the honeycomb base body 6, the ratio of the length L in the central axis direction (see FIG. 2) to the diameter D of one end face 2 (see FIG. 2) is preferably 0.5 to 1.4, more preferably 0.8 to 1.2, particularly preferably 0.8 to 1.1. When the ratio is smaller than 0.5, the amount of the exhaust gas passing though the partition walls 5 is smaller, which may cause a reduction in the efficiency of soot capture. Meanwhile, when the ratio is larger than 1.4, the pressure loss is larger, which may cause a reduction in engine output.

As shown in FIG. 2 and FIG. 3, it is necessary that, of the outermost peripheral cells 4(14), those cells whose hydraulic diameter is 5 to 75% of the hydraulic diameter of a cell other than the outermost peripheral cells, need to be through-cells; it is preferable that those cells having a hydraulic diameter of 5 to 60% are through-cells; it is more preferable that those cells having a hydraulic diameter of 5 to 50% are through-cells. When the hydraulic diameter is smaller than 5%, the number of cells in the peripheral portion of honeycomb catalyst body, in which soot accumulates easily, is larger and there occurs sudden combustion of soot, causing the breakage of the peripheral portion. Meanwhile, when the hydraulic diameter is larger than 75%, the soot in exhaust gas is discharged without being captured sufficiently. That is, the hydraulic diameter of through-cells is too large, making insufficient the efficiency of soot capture. In the present specification, "the hydraulic diameter of cell" is a value calculated from an expression of [4×(sectional area)/(circumferential length)]. Here, "sectional area" refers to the area of cell in section normal to cell-extending direction, and "circumferential length" refers to "the length of circumference of cell" in section normal cell-extending direction.

In the honeycomb base body 6, the hydraulic diameter of each cell 4 at one end face 2 and the hydraulic diameter of each cell 4 at other end face 3 may be the same or different. Each case is allowed, but it is preferred that the hydraulic diameter of each cell 4 at one end face 2 and the hydraulic diameter of each cell 4 at other end face 3 are different. Specifically explaining, it is preferred that, in purification of the exhaust gas emitted from a gasoline engine, the hydraulic diameter of each cell 4 at one end face 2 is preferably smaller than the hydraulic diameter of each cell 4 at other end face 3, in order to obtain a smaller pressure loss. It is preferred that the hydraulic diameter of each cell 4 at one end face 2 is 20 to 45% of the hydraulic diameter of each cell 4 at other end face 3.

The ratio of the total area of the through-cells in the section of honeycomb base body 6 intersecting with the central axis of honeycomb base body 6 at right angles, to the area of the section is preferably 0.1 to 1.5%, more preferably 0.1 to 1.0%, particularly preferably 0.1 to 0.5%, most preferably 0.1 to 0.2%. When the ratio is smaller than 0.1%, the number of cells in the peripheral portion of honeycomb catalyst body, in which soot accumulates easily, is larger and there occurs sudden combustion of soot, which may cause the breakage of the peripheral portion. Meanwhile, when the ratio is larger than 1.5%, the ratio of through-cells capturing no soot is too large, which may reduce the efficiency of soot capture.

There is no particular restriction as to the shape of the cell 4 of honeycomb base body 6. However, the cell shape is preferably a polygon (e.g. triangle, tetragon, pentagon, hexagon or octagon), a circle, or an oval, in the section intersecting with the central axis at right angles. The cell shape may be an indeterminate shape. Also, a combination shape of tetragon and octagon is preferred.

The external shape of the honeycomb base body 6 (honeycomb catalyst body 100) is not restricted to a cylinder shown in FIG. 1. There can also be mentioned an elliptic cylinder, a prism having a polygonal (e.g. tetragonal) bottom, a column having an indeterminate bottom or the like. As to the size of the honeycomb base body 6 (honeycomb catalyst body 100), the length L in the central axis direction (see FIG. 2) is preferably 50 to 160 mm. When the honeycomb base body 6 has, for example, a cylindrical external shape, the bottom diameter D (see FIG. 2) is preferably 80 to 160 mm. When the honeycomb base body 6 has a shape other than cylinder, the bottom area thereof is preferably the same as the bottom area of the honeycomb base body, just explained above, having a cylindrical shape.

[1-2] Plugged Portion

The material (ceramic raw material) of the plugged portion 8 of honeycomb catalyst body 100 is preferably the same as the material of the partition wall 5 of honeycomb base body 6. Thereby, each plugged portion 8 can bond strongly to partition walls 5, during firing.

There is no particular restriction as to the pattern in which the plugged portions 8 are formed, as long as part of a plurality of cells is plugged. However, it is preferred that, as shown in FIGS. 1 to 3, given cells (part of cells) 4(4a) each having a plugged portion 8 at one end and residual cells 4(4b) each having a plugged portion at other end are arranged alternately and that plugged portions 8 are formed so that the given cells 4(4a) and the residual cells 4(4b) show a checkered pattern. By forming plugged portions 8 in this way, the exhaust gas flowing into the cells 4(4b) flows into the cells 4(4a) via the partition walls 5, whereby the soot in exhaust gas, unable to pass through the pores of partition wall 5 can be captured sufficiently.

The depth of each plugged portion 8 is preferably 1 to 10 mm, more preferably 1 to 5 mm. With a depth of smaller than 1 mm, the plugged portion 8 may have a lower strength. Meanwhile, with a depth of larger than 10 mm, the partition walls 5 may have a smaller area for PM capture. Here, the depth of the plugged portion 8 means a length thereof in the cell-extending direction.

[1-3] Catalyst

As described above, the partition walls 5 of honeycomb base body 6 have a catalyst loaded thereon. The catalyst enables purification of hydrocarbons (HC), carbon monoxide (CO) and nitrogen oxides (NOx).

As the catalyst, there can be mentioned a three-way catalyst, an oxidation catalyst, a SCR catalyst for NOx selective reduction, an NOx occlusion catalyst or the like.

The three-way catalyst refers to a catalyst which purifies mainly hydrocarbons (HC), carbon monoxide (CO) and nitrogen oxides (NOx). There can be mentioned, for example, a catalyst containing platinum (Pt), palladium (Pd) and rhodium (Rh). The three-way catalyst enables conversion of hydrocarbons into water and carbon dioxide, conversion of carbon monoxide into carbon dioxide, and conversion of nitrogen oxides into nitrogen, by oxidation or reduction.

As the SCR catalyst for NOx selective reduction, there can be mentioned a catalyst containing at least one member selected from the group consisting of metal-substituted zeolite, vanadium, titania, tungsten oxide, silver and alumina. As the NOx occlusion catalyst, there can be mentioned, for example, an alkali metal and/or an alkaline earth metal. The alkali metal includes K, Na, Li or the like. The alkaline earth metal includes Ca or the like. The total amount of K, Na, Li and Ca is preferably at least 5 g per unit volume (1 $cm^3$) of the plugged honeycomb catalyst body 100.

The loaded amount of catalyst per unit volume is preferably 10 to 140 g/L, more preferably 20 to 140 g/L, particularly preferably 40 to 80 g/L. With a loaded amount of smaller than 10 g/L, the sufficient purification of exhaust gas may be difficult. Meanwhile, with a loaded amount of larger than 140 g/L, the pressure loss may be too large.

[2] Process for Production of Honeycomb Catalyst Body

An embodiment of the honeycomb catalyst body of the present invention can be produced, for example, as follows. Firstly, a raw material for formation of honeycomb body is kneaded to obtain a puddle. Then, the puddle is extruded into a honeycomb shape to obtain a honeycomb formed body having a plurality of cells. Then, given cells 4(4a) of the honeycomb formed body are plugged at one end face of the body with a plugging material, after which residual cells 4(4b) of the body are plugged at other end face of the body with the same plugging material. Then, the resulting honeycomb body is fired to obtain a plugged honeycomb fired body in which given cells 4(4a) are plugged at one end face 2 and residual cells 4(4b) are plugged at other end face 3. Then, one end of the plugged honeycomb fired body is dipped in a catalyst slurry and suction is used from the other end, whereby a catalyst is coated (loaded) on the partition walls 5. Then, firing is conducted to obtain a honeycomb catalyst body 100.

The raw material for formation of honeycomb body is preferably a mixture of a ceramic raw material with a dispersing medium and additives. As the additives, there can be mentioned an organic binder, a pore former, a surfactant or the like. As the dispersing medium, water or the like. can be mentioned.

The ceramic raw material is preferably at least one member selected from the group consisting of silicon carbide, silicon-silicon carbide composite material, a raw material for cordierite formation, mullite, alumina, spinel, silicon carbide-cordierite composite material, lithium aluminum silicate and aluminum titanate. Of these, preferred is a raw material for cordierite formation, which is small in thermal expansion coefficient and superior in thermal shock resistance. The content of the ceramic raw material is preferably 70 to 80 mass % relative to the total of the raw material for formation of honeycomb body.

As the organic binder, there can be mentioned methyl cellulose, hydroxypropoxyl cellulose, hydroxyethyl cellulose, carboxymethyl cellulose, polyvinyl alcohol or the like. Of these, a combination use of methyl cellulose and hydroxypropoxyl cellulose is preferred. The content of the binder is preferably 1 to 10 mass % relative to the total of the raw material for formation of honeycomb body.

As to the pore former, there is no particular restriction as long as it produces pores after firing. There can be mentioned, for example, starch, foamed resin, water-absorptive resin and silica gel. The content of the pore former is preferably 1 to 10 mass % relative to the total of the raw material for formation of honeycomb body. By appropriately controlling the particle diameters and amount of the pore former, the pore diameter and porosity of partition wall can be controlled.

As the surfactant, there can be used ethylene glycol, dextrin, fatty acid soap, polyalcohol or the like. They may be used singly or in combination of two or more kinds. The content of the surfactant is preferably 0.1 to 5 mass % relative to the total of the raw material for formation of honeycomb body.

The content of the dispersing medium is preferably 0.1 to 5 mass % relative to the total of the raw material for formation of honeycomb body.

By appropriately selecting the particle diameter and amount of the ceramic raw material (aggregate particles) used and the particle diameter and amount of the pore former added, there can be obtained a porous base body having a desired porosity and average pore diameter.

As to the method for kneading the raw material for formation of honeycomb body, to obtain a puddle, there is no particular restriction. As the method, there can be mentioned, for example, a method using a kneader or a vacuum pugmill. Extrusion can be conducted using a die having a desired cell shape, partition wall thickness and cell density. The material for die is preferably a super hard alloy which is highly resistant to wear.

As the method for plugging cell ends, there can be mentioned a method of filling a plugging material into a cell end. Specifically explaining, a mask is applied on one end face of the honeycomb formed body to cover the cell ends of the one end face. Then, a laser is applied to the portions of the mask, corresponding to each one open end of given cells of the cells (complete cells) other than the outermost peripheral cells formed by the partition walls and the outer wall, whereby holes are formed at the above-mentioned mask portions corresponding to the given cells. Incidentally, the method for forming holes in the mask includes, besides the above method of laser application, for example, a method of using a needle. In this case, no hole is formed at the mask portions corresponding to those cells (incomplete cells) of the outermost peripheral cells, whose hydraulic diameter is 5 to 75% of the hydraulic diameter of a cell other than the outermost peripheral cells. That is, no plugged portion is formed in the incomplete cells.

Then, one end of honeycomb formed body at its one end face side 2 to which the mask has been applied, is dipped in a plugging slurry to fill the slurry into each one open end of the given cells 4(4a), (that is, each one open end of the given cells 4(4a) are plugged with a plugging material). The plugging slurry is a slurry containing a ceramic raw material, water or an alcohol and an organic binder. The ceramic raw material is preferably the same as the ceramic raw material which is used as the raw material of honeycomb formed body. The ceramic raw material is used in an amount of preferably 70 to 90 mass % relative to the total of the plugging material. The water or alcohol is used in an amount of preferably 10 to 30 mass % relative to the total of the plugging material. The organic binder is used in an amount of preferably 0.1 to 2.0 mass % relative to the total of the plugging material. As the organic binder, there can be mentioned hydroxypropoxyl methyl cellulose, methyl cellulose or the like. The viscosity of the plugging material is preferably 600 to 1,200 Pa·s. Incidentally, the viscosity of the plugging material is a value obtained by measurement at 30° C. at 30 rpm using a rotation viscometer.

Then, a mask is applied on other end face 3 of the honeycomb formed body to cover the cell ends of the other end face 3. Then, a laser is applied to the portions of the mask, corresponding to each one open end of residual cells 4(4b) of the cells (complete cells) of other than the outermost peripheral cells 4(14) formed by the partition walls 5 and the outer wall 7, whereby holes are formed at the above-mentioned mask portions corresponding to the residual cells 4(4b). Incidentally, the method for forming holes in the mask includes, besides the above method of laser application, for example, a method of using a needle.

Then, other end of honeycomb formed body at its other end face side to which the mask has been applied, is dipped in a plugging slurry containing a raw material for plug formation, to fill the plugging slurry into each other open end of the residual cells 4(4b) (that is, the each other open end of the residual cells 4(4b) are plugged with a plugging material). The plugging slurry may be the same as mentioned above. In this case, no hole is formed at the mask portions corresponding to those cells (incomplete cells) of the outermost peripheral cells 4(14), whose hydraulic diameter is 5 to 75% of the hydraulic diameter of a cell other than the outermost peripheral cells is 5 to 75%. That is, no plugged portion is formed in the incomplete cells. Incidentally, hole formation in the mask is preferably conducted so that the plugged given cells 4(4a) and the non-plugged residual cells 4(4b) are present alternately and show a checkered pattern. In this way, a plugged honeycomb formed body can be obtained.

The firing temperature can be determined appropriately depending upon the material of honeycomb formed body. When the material of honeycomb formed body is, for example, cordierite, the firing temperature is preferably 1,380 to 1,450° C., more preferably 1,400 to 1,440° C. The firing time is preferably about 3 to 10 hours.

The plugged honeycomb formed body may be dried before drying. As to the method for drying, there is no particular restriction; however, there can be mentioned, for example, hot-air drying, microwave drying, dielectric drying, reduced pressure drying, vacuum drying and freeze-drying. Of these, dielectric drying, microwave drying or hot-air drying can preferably be done either alone or as a combination thereof. The drying conditions are preferably 30 to 150° C. (drying temperature) and 1 minute to 2 hours (drying time).

It is also possible that, a honeycomb formed body before formation of plugged portion therein is fired to obtain a honeycomb fired body, a plugging material is filled into the open ends of given cells 4(4a) at one end face 2 of the honeycomb fired body and the open ends of residual cells 4(4b) at other end face 3, then firing is conducted to obtain a plugged honeycomb fired body.

As to the method for coating a catalyst slurry on the partition walls (loading the catalyst on the partition walls), there is no particular restriction, and the coating can be made using a known method. For example, firstly, a catalyst slurry containing a catalyst is prepared. Then, the catalyst slurry is allowed to flow into cells from one end face side of the plugged honeycomb fired body, by dipping or suction. Preferably, the catalyst slurry is coated on the whole surface of partition wall. After the catalyst slurry has been taken into the cells, the excessive slurry is blown off using compressed air. Then, the catalyst slurry is dried and baked, whereby a honeycomb catalyst body having a catalyst loaded on the partition walls can be obtained.

Incidentally, the drying conditions are preferably 80 to 150° C. and 1 to 6 hours. The baking conditions are preferably 450 to 700° C. and 0.5 to 6 hours. As the component other than the catalyst, contained in the catalyst slurry, alumina or the like. can be mentioned.

EXAMPLES

The present invention is described specifically below by way of examples. However, the present invention is in no way restricted to the following examples.

Example 1

First, alumina, aluminum hydroxide, kaolin, talc and silica were mixed to prepare a raw material for cordierite formation. To 100 mass parts of the raw material for cordierite formation were added 13 mass parts of a pore former, 35 mass parts of a dispersing medium, 6 mass parts of an organic binder and 0.5 mass part of a dispersing agent, followed by mixing and kneading, to prepare a puddle. Water was used as the dispersing medium; coke having an average particle diameter of 1 to 10 μm was used as the pore former; hydroxypropyl methyl cellulose was used as the organic binder; and ethylene glycol was used as the dispersing agent.

Then, the puddle was extruded using a given die to obtain a honeycomb formed body having a tetragonal cell shape and a cylindrical overall shape. The honeycomb formed body was dried using a microwave dryer and further dried completely using a hot-air dryer. The resulting honeycomb formed body was cut at the two ends for adjustment into a given size.

Then, a mask was applied on one end face of the honeycomb formed body to cover the cell ends of the one end face. Then, a laser was applied to the portions of the mask, corresponding to each one open end of given cells of the cells (complete cells) other than the outermost peripheral cells formed by the partition walls and the outer wall, whereby holes were formed at the above-mentioned mask portions corresponding to the given cells. Then, one end of honeycomb formed body at its one end face side to which the mask had been applied, was dipped in a plugging slurry containing a raw material for plug formation, to fill the plugging slurry into each one open end of the given cells.

Then, a mask was applied on other end face of the honeycomb formed body to cover the cell ends of the other end face. Then, a laser was applied to the portions of the mask, corresponding to each one open end of residual cells of the cells (complete cells) of other than the outermost peripheral cells formed by the partition walls and the outer wall, whereby holes were formed at the above-mentioned mask portions corresponding to the residual cells. Then, other end of honeycomb formed body at its other end face side to which the mask had been applied, was dipped in a plugging slurry containing a raw material for plug formation, to fill the plugging slurry into each other open end of the residual cells, to obtain a plugged honeycomb formed body. Then, the plugged honeycomb formed body was dried using a hot-air dryer and then fired at 1,410 to 1,440° C. for 5 hours to obtain a plugged honeycomb fired body having plugged portions. Incidentally, the plugged portions were formed in each open end of the given cells at one end face and in each one open end of the residual cells at other end face so that each end face showed a checkered pattern. No plugged portion was formed in the cells (incomplete cells) of the outermost peripheral cells, whose hydraulic diameter is 5 to 75% of the hydraulic diameter of a cell (complete cell) other than the outermost peripheral cells.

Then, mixed particles (specific surface area: 50 m$^2$/g) of $\gamma Al_2O_3$ having an average particle diameter of 100 μm and $Ce_2O_3$ having an average particle diameter of 100 μm were wet-disintegrated in a ball mill to obtain porous, disintegrated particles having an average particle diameter of 5 μm. The disintegrated particles were dipped in a Pt- and Rh-containing solution to load Pt and Rh in the pores of the disintegrated particles. To the Pt- and Rh-loaded disintegrated particles were added acetic acid and water to obtain a catalyst slurry. In the catalyst slurry was dipped one end of the plugged honeycomb fired body. Then, suction was used from the other end side of the plugged honeycomb fired body to load a catalyst on the partition walls (a catalyst layer was formed on the surfaces of the partition walls as well as on the surfaces of the pores of the partition walls). Then, drying was conducted, followed by firing at 600° C. for 3 hours, to obtain a honeycomb catalyst body.

In the honeycomb catalyst body, the diameter was 118 mm; the length in the central axis direction was 60 mm; the ratio (L/D) of the length L in the central axis direction to the diameter D of one end face, in the honeycomb base body was 0.51; the cell density was 31.0 cells/cm$^2$: the rib thickness (partition wall thickness) was 0.102 mm; the porosity of partition wall was 35.0%; the ratio of the total area of the cells in the section of honeycomb base body intersecting with the central axis of honeycomb base body at right angles, to the area of the above section (in Table 1, this ratio is expressed as "cell area ratio") was 86.6%; the hydraulic diameter of cells (complete cells) other than the outermost peripheral cells was 1.87 mm; the maximum of the hydraulic diameters of incomplete cells [in Table 1, the maximum is expressed as "through-cell (maximum)"] was 1.31; the ratio of the largest value of the hydraulic diameters of incomplete cells, to the hydraulic diameter of complete cells [in Table 1, this ratio is expressed as "B/A (%)"] was 70%; the ratio of the total area of the through-cells in the section of honeycomb base body intersecting with the central axis of honeycomb base body at right angles, to the area of the above section [in Table 1, this ratio is expressed as "areal ratio of through-cells in section (%)"] was 1.50%; the average pore diameter of partition walls [in Table 1, expressed as "pore diameter (μm)"] was 6 μm; the amount of catalyst loaded on the partition walls of honeycomb base body was 60 g/L; and the amount of noble metals loaded on the partition walls of honeycomb base body was 0.5 g/L.

Incidentally, the amount of oxides ($\gamma Al_2O_3$ and $CeO_2$) loaded per unit volume of honeycomb catalyst body was 10 to 60 g/L; the amount of Pt loaded per unit volume of honeycomb catalyst body was 0.1 to 1 g/L; and the amount of Rh loaded per unit volume of honeycomb catalyst body was 0.05 to 0.2 g/L. The average pore diameter of catalyst layer was the same as the average particle diameter of disintegrated particles of 5 μm.

The honeycomb catalyst body obtained was rated for "purification ratio", "PM emission", "durability", "pressure loss" and "overall evaluation", according to the following methods. The results are shown in Table 2. The porosity and average pore diameter of partition wall were measured using a mercury porosimeter. The rib thickness (partition wall thickness) was measured using a scanning electron microscope (SEM).

[Measurement Method of Purification Ratio]

The prepared honeycomb catalyst body was stored in a can body to obtain an exhaust gas purification device. The exhaust gas purification device obtained is fitted to the exhaust gas system of a passenger car having a direct injection type gasoline engine (displacement: 2.0 liters) mounted thereon. Then, the engine is operated under the operation mode specified by Europe, in a vehicle test using a chassis dynamometer, to measure the emission of the carbon monoxide, hydrocarbons and nitrogen oxides present in the exhaust gas emitted from the engine. The emission obtained is compared with the amount specified by Euro 5. A case in which the emission of all components (carbon monoxide, hydrocarbons and nitrogen oxides) is smaller than the specification amount, is taken as pass "A"; and a case in which the emission is not smaller than the specification amount, is taken as fail "B". Incidentally, this rating is shown, in Table 2, as "purification ratio (CO, HC and NOx)".

[Measurement Method of PM Emission]

The exhaust gas purification device obtained is fitted to the exhaust gas system of a passenger car having a direct injection type gasoline engine (displacement: 2.0 liters) mounted thereon. Then, the engine is operated under the operation mode specified by Europe, in a vehicle test using a chassis dynamometer, to measure the number of PM emitted, present in the exhaust gas emitted from the engine, according to a method based on the Euro 6 proposal. Incidentally, a case in which the number of PM emitted is $6 \times 10^{11}$ per km or smaller, satisfies the Euro 6 proposal. In Table 2, this rating is shown as "PM emission (number/km)". A case in which the proposal is satisfied (a case in which the number of PM emitted is $6 \times 10^{11}$ per km or smaller), is taken as pass "A"; and a case in which the proposal is not satisfied (a case in which the number of PM emitted is larger than $6 \times 10^{11}$ per km), is taken as fail "B".

[Measurement Method of Durability]

Durability is measured according to the following method. First, a soot-containing gas of 500° C. is passed through a honeycomb catalyst body to deposit soot therein in an amount of 2 g/L. Then, the temperature of the gas which is passed through the honeycomb catalyst body, is elevated to 800° C. This operation is taken as 1 cycle and is repeated 100 times (100 cycles), after which the honeycomb catalyst body is observed for the presence of cracks. A case in which no crack is observed, is taken as pass "A"; and a case in which cracks are observed, is taken as fail "B". Incidentally, in Table 2, this rating is shown as "durability in repeated regeneration".

[Measurement Method of Pressure Loss]

In a bench test of a direct injection type gasoline engine having a displacement of 2.0 liters, there is first fitted, to the exhaust gas system of the engine, a honeycomb structure of flow-through type of 93 cells/cm² in cell density, 0.076 mm in partition wall thickness (rib thickness), 105.7 mm in diameter, and 114 mm in length of lengthwise direction. A pressure loss in engine full-load operation is measured and it is taken as base value. Meanwhile, the exhaust gas purification device obtained is fitted to the exhaust gas system and a pressure loss is measured under the same engine full-load operation as above. A case in which the increase in pressure loss over the base value is smaller than 10 kPa, is taken as pass "A"; and a case in which the increase in pressure loss is 10 kPa or larger, is taken as fail "B". Incidentally, in Table 2, this rating is expressed as "pressure loss".

[Determination of Overall Evaluation]

A case in which all ratings of the above "purification ratio", "PM emission", "durability" and "pressure loss" are pass "A", is taken as "A"; and a case in which at least one of the above ratings is fail "B", is taken as fail "B".

TABLE 1

| | Honeycomb catalyst body | | | | | | | | | | | |
|---|---|---|---|---|---|---|---|---|---|---|---|---|
| | | | | | Rib thick- | | Cell area | Cell hydraulic diameter (mm) | | | Areal ratio of through- cells in | Pore dia- | Loaded amount of | Amount of noble |
| | Dia- meter (mm) | Length (mm) | L/D | Cell density (cells/cm²) | ness (mm) | Porosity (%) | ratio (%) | Complete cell | Through- cell (maximum) | B/A (%) | section (%) | meter (μm) | catalyst (g/L) | metals (g/L) |
| Example 1 | 118 | 60 | 0.51 | 31.0 | 0.102 | 35.0 | 86.6 | 1.87 | 1.31 | 70 | 1.50 | 6 | 60 | 0.5 |
| Example 2 | 118 | 60 | 0.51 | 55.8 | 0.102 | 35.0 | 86.6 | 1.37 | 0.90 | 66 | 1.20 | 6 | 60 | 0.5 |
| Example 3 | 118 | 60 | 0.51 | 46.5 | 0.102 | 35.0 | 86.6 | 1.51 | 1.00 | 66 | 1.30 | 6 | 60 | 0.5 |
| Example 4 | 118 | 110 | 0.93 | 46.5 | 0.152 | 38.0 | 80.3 | 1.46 | 0.70 | 48 | 0.20 | 7 | 100 | 0.5 |
| Example 5 | 118 | 155 | 1.31 | 46.5 | 0.254 | 38.0 | 68.4 | 1.36 | 0.30 | 22 | 0.10 | 10 | 140 | 0.5 |
| Example 6 | 118 | 60 | 0.51 | 46.5 | 0.356 | 45.0 | 57.4 | 1.26 | 0.50 | 40 | 0.20 | 15 | 140 | 0.5 |
| Example 7 | 118 | 110 | 0.93 | 46.5 | 0.406 | 61.0 | 52.3 | 1.21 | 0.60 | 50 | 0.70 | 30 | 140 | 0.5 |
| Example 8 | 118 | 155 | 1.31 | 46.5 | 0.457 | 61.0 | 47.4 | 1.16 | 0.20 | 17 | 0.10 | 32 | 140 | 0.5 |
| Example 9 | 118 | 155 | 1.31 | 46.5 | 0.457 | 61.0 | 47.4 | 1.16 | 0.50 | 43 | 0.50 | 48 | 140 | 0.5 |
| Example 10 | 118 | 60 | 0.51 | 46.5 | 0.356 | 45.0 | 57.4 | 1.26 | 0.40 | 32 | 0.15 | 15 | 120 | 0.5 |
| Example 11 | 118 | 60 | 0.51 | 46.5 | 0.356 | 45.0 | 57.4 | 1.26 | 0.30 | 24 | 0.12 | 15 | 120 | 0.5 |
| Comparative Example 1 | 118 | 60 | 0.51 | 46.5 | 0.102 | 35.0 | 86.6 | 1.51 | 1.51 | 100 | 2.00 | 6 | 60 | 0.5 |
| Comparative Example 2 | 118 | 60 | 0.51 | 46.5 | 0.102 | 35.0 | 86.6 | 1.51 | 1.40 | 93 | 1.80 | 6 | 60 | 0.5 |
| Comparative Example 3 | 118 | 60 | 0.51 | 46.5 | 0.102 | 35.0 | 86.6 | 1.51 | 1.35 | 89 | 1.70 | 6 | 60 | 0.5 |

TABLE 2

| | Rating results | | | | |
|---|---|---|---|---|---|
| | Purification ratio (CO, HC, NOx) | PM emission (particle number/km) | Durability in repeated regeneration | Pressure loss | Overall evaluation |
| Example 1 | A | $3 \times 10^{11}$ | A | A | A | A |
| Example 2 | A | $2 \times 10^{11}$ | A | A | A | A |
| Example 3 | A | $2.5 \times 10^{11}$ | A | A | A | A |
| Example 4 | A | $1 \times 10^{11}$ | A | A | A | A |
| Example 5 | A | $1 \times 10^{11}$ | A | A | A | A |
| Example 6 | A | $1 \times 10^{11}$ | A | A | A | A |
| Example 7 | A | $2 \times 10^{11}$ | A | A | A | A |
| Example 8 | A | $1 \times 10^{11}$ | A | A | A | A |
| Example 9 | A | $2 \times 10^{11}$ | A | A | A | A |
| Example 10 | A | $1 \times 10^{11}$ | A | A | A | A |
| Example 11 | A | $1 \times 10^{11}$ | A | A | A | A |
| Comparative Example 1 | A | $20 \times 10^{11}$ | B | B | A | B |
| Comparative Example 2 | A | $15 \times 10^{11}$ | B | B | A | B |
| Comparative Example 3 | A | $10 \times 10^{11}$ | B | B | A | B |

Examples 2 to 11

Comparative Examples 1 to 3

Honeycomb catalyst bodies of Examples 2 to 11 and Comparative Examples 1 to 3 were produced in the same manner as in Example 1 except that their diameters, lengths, L/D's, cell densities, rib thicknesses, porosities, cell area ratios, hydraulic diameters of complete cells, hydraulic diameters (maximums) of through-cells, areal ratios of through-cells in section, pore diameters, loaded amounts of catalyst, and amounts of noble metals were as shown in Table 1. Then, they were rated for "purification ratio", "PM emission", "durability", "pressure loss" and "overall evaluation" in the same manners as in Example 1.

As is clear from Table 2, in the honeycomb catalyst bodies of Examples 1 to 11, as compared with the honeycomb catalyst bodies of Comparative Examples 1 to 3, the fine particles contained in the exhaust gas emitted from the direct injection type gasoline engine could be removed efficiently; the increases in pressure loss were small; the CO, HC and NOx contained in the exhaust gas could be purified; during the use, there were hardly seen cracks in the peripheral portions.

Particularly in the honeycomb catalyst bodies of Examples 4 to 6, 8, 10 and 11, the ratio of through-cells, i.e. the ratio of the total area of through-cells in a section intersecting with the central axis of honeycomb base body at right angles, to the area of the section is 0.20% or smaller; therefore, the PM emission measured was $1 \times 10^{11}$ or smaller and the purification of exhaust gas was satisfactory.

In the honeycomb catalyst bodies of Comparative Examples 1 to 3, of the outermost peripheral cells, those cells whose hydraulic diameter to the hydraulic diameter of the cells other than the outermost peripheral cells exceeded 75%, were through-cells having no plugged portion; therefore, it was impossible to sufficiently capture the soot in exhaust gas, at the initial stage after engine start and the ratings of PM emission were inferior. Further, a large amount of soot was accumulated in the outermost peripheral cells after long-hour operation, which caused sudden ignition of soot and local (peripheral portion) temperature rise. Resultantly, cracks appeared at the peripheral portions and the durabilities were insufficient.

INDUSTRIAL APPLICABILITY

The honeycomb catalyst body of the present invention can be used preferably for the purification of the exhaust gas emitted from a direct injection gasoline engine.

EXPLANATION OF NUMERICAL SYMBOLS

2: one end face; 3: other end face; 4: a cell; 4a: a given cell; 4b: a residual cell; 5: a partition wall; 6: a honeycomb base body; 7: an outer wall; 8: a plugged portion; 14: an outermost peripheral cell; 100: a honeycomb catalyst body

The invention claimed is:

1. A honeycomb catalyst body comprising
    a honeycomb base body having porous partition walls forming a plurality of divided cells which extend from one end face of honeycomb base body to its other end face and which function as a fluid passage, and an outer wall present at the outermost peripheral portion of honeycomb base body, plugged portions provided so as to plug part of the plurality of divided cells, and
    a catalyst loaded on the partition walls of honeycomb base body, wherein
    the plurality of divided cells include outermost peripheral cells formed by the partition walls and the outer wall,
    wherein outermost peripheral cells having a hydraulic diameter of 5-75% of a hydraulic diameter of a cell other than an outermost peripheral cell are through-cells having no plugged portion, and all remaining cells other than the through-cells are plugged at the one end face or at the other end face of the honeycomb base body.

2. A honeycomb catalyst body according to claim 1, wherein a total area of the through-cells in a cross-section of honeycomb base body, which appears by cutting the honeycomb base body perpendicular to the central axis, is 0.1 to 1.5% of a total area of the cross-section of the honeycomb base body.

3. A honeycomb catalyst body according to claim 2, wherein the loaded amount of catalyst per unit volume is 10 to 60 g/L.

4. A honeycomb catalyst body according to claim 3, wherein, in the honeycomb base body, the thickness of partition wall is 100 to 460 μm, the cell density is 31 to 56 cells/cm², the porosity of partition wall is 35 to 65%, and the average pore diameter of partition wall is 5 to 50 μm.

5. A honeycomb catalyst body according to claim 2, wherein, in the honeycomb base body, the thickness of partition wall is 100 to 460 μm, the cell density is 31 to 56 cells/cm², the porosity of partition wall is 35 to 65%, and the average pore diameter of partition wall is 5 to 50 μm.

6. A honeycomb catalyst body according to claim 1, wherein the loaded amount of catalyst per unit volume is 10 to 60 g/L.

7. A honeycomb catalyst body according to claim 6, wherein, in the honeycomb base body, the thickness of partition wall is 100 to 460 μm, the cell density is 31 to 56 cells/cm², the porosity of partition wall is 35 to 65%, and the average pore diameter of partition wall is 5 to 50 μm.

8. A honeycomb catalyst body according to claim 1, wherein, in the honeycomb base body, the thickness of partition wall is 100 to 460 μm, the cell density is 31 to 56 cells/cm², the porosity of partition wall is 35 to 65%, and the average pore diameter of partition wall is 5 to 50 μm.

* * * * *